US009721211B2

(12) United States Patent
Nicholson et al.

(10) Patent No.: US 9,721,211 B2
(45) Date of Patent: Aug. 1, 2017

(54) SYSTEM AND METHOD FOR SENSOR DATA PROCESSING TO DETERMINE POSITION OF A VEHICLE

(75) Inventors: David Nicholson, Thornbury (GB); Christopher Mark Lloyd, Cotham (GB); Steven Reece, Oxford (GB); Stephen John Roberts, Wootton (GB)

(73) Assignee: BAE SYSTEMS plc, London (GB)

( * ) Notice: Subject to any disclaimer, the term of this patent is extended or adjusted under 35 U.S.C. 154(b) by 779 days.

(21) Appl. No.: 14/124,177

(22) PCT Filed: May 31, 2012

(86) PCT No.: PCT/GB2012/000482
§ 371 (c)(1),
(2), (4) Date: Dec. 5, 2013

(87) PCT Pub. No.: WO2012/164244
PCT Pub. Date: Dec. 6, 2012

(65) Prior Publication Data
US 2014/0122392 A1    May 1, 2014

(30) Foreign Application Priority Data

Jun. 1, 2011  (EP) .................................. 11250575
Jun. 1, 2011  (GB) ................................. 1109210.3

(51) Int. Cl.
*G06N 99/00* (2010.01)
*G06K 9/62* (2006.01)

(52) U.S. Cl.
CPC ........... *G06N 99/005* (2013.01); *G06K 9/629* (2013.01)

(58) Field of Classification Search
None
See application file for complete search history.

(56) References Cited

U.S. PATENT DOCUMENTS

| 6,216,119 | B1 | 4/2001 | Jannarone |
| 9,367,819 | B2 | 6/2016 | Nicholson et al. |
| 2006/0099624 | A1 | 5/2006 | Wang et al. |

(Continued)

FOREIGN PATENT DOCUMENTS

WO    WO 2010/129998 A1    11/2010

OTHER PUBLICATIONS

Jaakkola, Tommi S., and David Haussler. "Probabilistic kernel regression models." AISTATS. 1999.*

(Continued)

*Primary Examiner* — Paulinho E Smith
*Assistant Examiner* — Robert Bejcek, II
(74) *Attorney, Agent, or Firm* — Finch & Maloney PLLC

(57) ABSTRACT

A method and apparatus for processing data, the data including a set of one or more system inputs; and a set of one or more system outputs; wherein each system output corresponds to a respective system input. Each system input can include a plurality of data points, such that at least one of these data points is from a different data source to at least one other of those data points. The method includes performing a kernel function on a given system input from the data and a further system input to provide kernelized data; and inferring a value indicative of a significance of data from a particular data source; wherein the inferring includes applying a regression technique to the kernelized data.

20 Claims, 6 Drawing Sheets

(56) References Cited

U.S. PATENT DOCUMENTS

| | | | |
|---|---|---|---|
| 2008/0205768 A1* | 8/2008 | Srivastava | G06Q 10/00 382/206 |
| 2009/0057395 A1 | 3/2009 | He et al. | |
| 2011/0257949 A1* | 10/2011 | Vasudevan | G06F 17/18 703/2 |
| 2012/0023062 A1* | 1/2012 | Vashist | G06N 99/005 706/59 |

OTHER PUBLICATIONS

Gärtner, Thomas. A survey of kernels for structured data. ACM SIGKDD Explorations Newsletter Homepage archive, vol. 5 Issue 1, Jul. 2003, pp. 49-58.*

International Search Report (PCT/ISA/210) mailed on Jul. 2, 2012, by the European Patent Office as the International Searching Authority for International Application No. PCT/GB2012/000482.

European Search Report for EP 11250575.5 dated Nov. 2, 2011.

United Kingdom Search Report for GB 1109210.3 dated on Sep. 22, 2011.

S. Reece et al., "Determining Intent using Hard/Soft Data and Gaussian Process Classifiers", submitted to the 14$^{th}$ International Conference on Information Fusion (FUSION '11), Jul. 5-8, 2011, retrieved from the internet: http://www.robots.ox.ac.uk/~sjrob/Pubs/gp_rvm_fusion_2011.pdf, 8 pages.

M. Pravia et al., "Generation of a Fundamental Data Set for Hard/Soft Information Fusion", Proceedings of the 11$^{th}$ International Fusion (FUSION '08), Jun. 30, 2008, 8 pages.

D. Nicholson, "Defence Applications of Agent-Based Information Fusion", The Computer Journal, vol. 54, No. 2, May 19, 2010, XP-055004119.

N. Jennings, "ALADDIN End of Project Report", Autonomous Learning Agents for Decentralised Data and Information Networks (ALADDIN, Feb. 9, 2011, retrieved from the internet: http://www.aladdinproject.org/wp-content/uploads/2011/02/finalreport.pdf, 35 pages.

Penny, et al, "Bayesian Methods for Autoregressive Models," Neural Networks for Signal Processing X., 2000. Proceedings of the 2000 IEEE Signal Processing Society Workshop, Dec. 11-13, 2000. vol. 1, pp. 125-134.

Rasmussen, et al., "Gaussian Processes for Machine Learning," the MIT Press, 2006, ISBN 0-262-18253-X. Retreived from the Internet at URL: www.GaussianProcess.org/gpml on May 8, 2014. pp. 1-266.

Tipping, Michael E., "Sparse Bayesian Learning and the Relevance Vector Machine," Journal of Machine Learning Research, 2001. vol. 1, pp. 211-244.

"Bayesian linear regression," Retrieved from Wikipedia at URL: http://en.wikipedia.org/wiki/Bayesian_linear_regression on May 2, 2014, 4 pages.

Gartner, Thomas, "A survey of Kernels for structured data." Published in ACM SIGKDD Explorations Newsletter, vol. 5, Issue 1, Jul. 2003. Retrieved from the Internet at URL: http://dl.acm.org/citation.cfm?id=959248, on May 15, 2014, pp. 49-58.

* cited by examiner

SYSTEM AND METHOD FOR SENSOR DATA PROCESSING TO DETERMINE POSITION OF A VEHICLE

FIELD OF THE INVENTION

The present invention relates to methods and apparatus for processing data.

BACKGROUND

In many fields, (for example the fields of threat detection, object detection, and classification) there is a need for the extraction, fusion, analysis, and visualisation of large sets of data.

In many situations, such large sets of data may comprise data sets from multiple heterogeneous data sources, i.e. data sources that are independent and that produce dissimilar data sets. Heterogeneous data sources may, for example, use different terminology, units of measurement, domains, scopes, and provide different data types (e.g. binary, discrete, categorical, interval, probabilistic, and linguistic data types).

A Relevance Vector Machine (RVM) is a machine learning technique that can be used to process large data sets and provide inferences at relatively low computational cost.

However, with the conventional RVM, a number of basis functions needs to be provided a priori. Thus, conventional RVM techniques tend to have limited flexibility. Typically the RVM is trained using a set of training data comprising inputs and corresponding outputs of a system. However, the conventional RVM tends to fail to adequately model the uncertainty about an output corresponding to an input that is 'far away' from the inputs in the set of training data.

SUMMARY OF THE INVENTION

In a first aspect, the present invention provides a method of processing data, the data comprising: a set of one or more system inputs, and a set of one or more system outputs, wherein each system output corresponds to a respective system input, each system input comprises a plurality of data points, such that at least one of these data points is from a data source different from at least one other of those data points, the method comprising: performing a kernel function on a given system input from the data and a further system input to provide kernelised data, and inferring a value indicative of a significance of data from a particular data source, wherein the step of inferring comprises applying a regression technique to the kernelised data.

A data point may be a data feature extracted from raw data using a feature extraction process. At least one of these data points may result from a feature extraction process different from that for at least one other of those data points.

A data point may be a data feature extracted from raw data using a feature extraction process. A data source may be a source of raw data.

The data sources may be heterogeneous data sources.

The kernel function may be a sum of further functions, each further function being a function of a data point of the given system input and a data point of the further system input.

The kernel function may be a product of further functions, each further function being a function of a data point of the given system input and a data point of the further system input.

Each further function may be a kernel function.

For a first data point corresponding to a first data source, and a second data point corresponding to a second data source, the first data source being a data source different from the second data source, the further function performed on the first data point may be a different function from the further function performed on the second data point.

A kernel function may be a Squared Exponential kernel, a Nominal kernel or a Rank kernel.

The regression technique may comprise implementing a Gaussian Process.

The method may further comprise measuring the further system input.

In a further aspect, the present invention provides apparatus for processing data, the data comprising: a set of one or more system inputs; and a set of one or more system outputs; wherein each system output corresponds to a respective system input; each system input comprises a plurality of data points, such that at least one of these data points is from a data source different from at least one other of those data points, the apparatus comprising: one or more processors arranged to: perform a kernel function on a given system input from the data and a further system input to provide kernelised data; and infer a value indicative of a significance of data from a particular data source; wherein the step of inferring comprises applying a regression technique to the kernelised data.

The data sources may be heterogeneous data sources.

In a further aspect, the present invention provides a program or plurality of programs arranged such that when executed by a computer system or one or more processors it/they cause the computer system or the one or more processors to operate in accordance with the method of any of the above aspects In a further aspect, the present invention provides a machine readable storage medium storing a program or at least one of the plurality of programs according to the above aspect.

DETAILED DESCRIPTION

Figure 1:
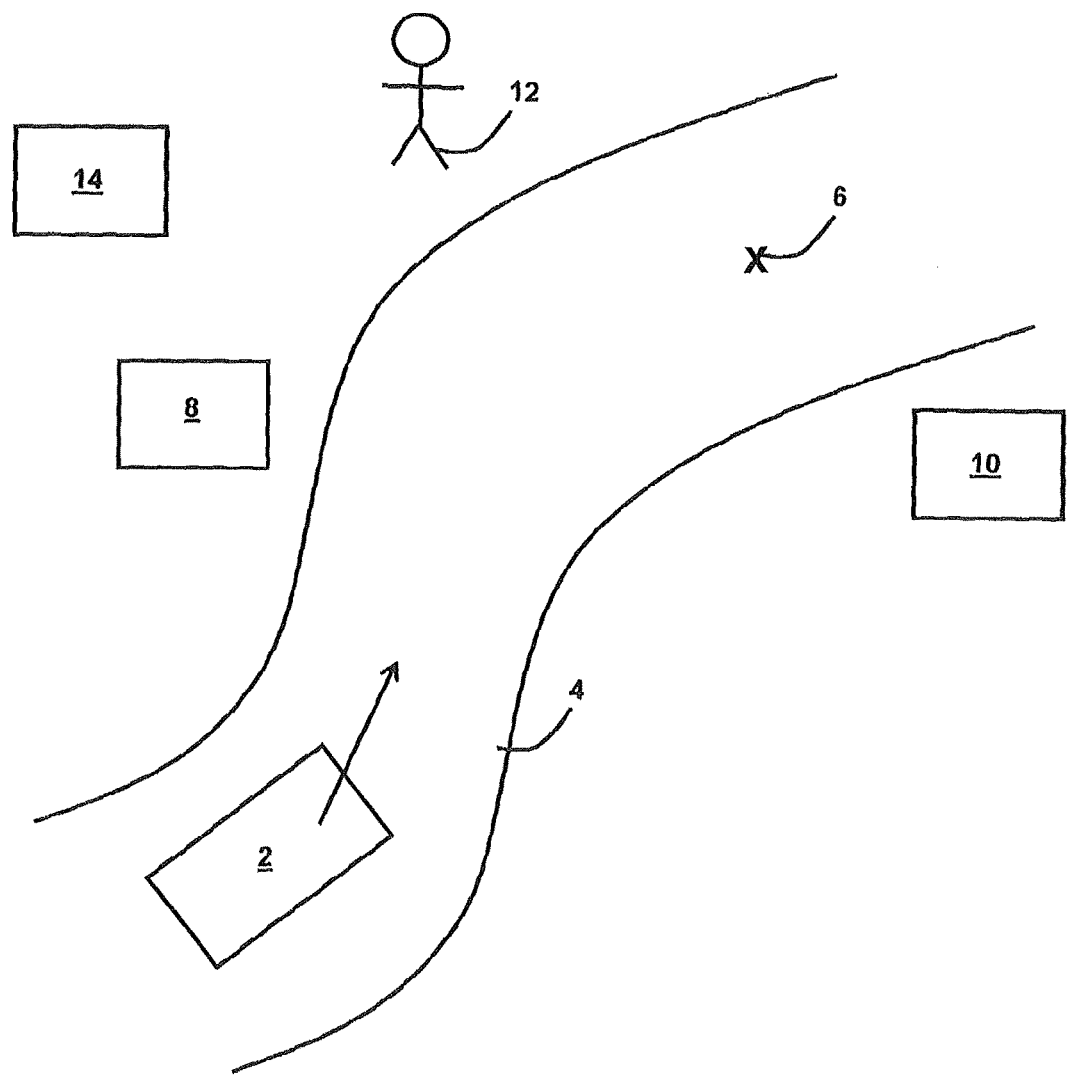
FIG. 1 is a schematic illustration (not to scale) of an example of a scenario in which an embodiment of an information fusion method is implemented.

FIG. 1 is a schematic illustration (not to scale) of an example of a scenario in which an embodiment of an information fusion method (described in more detail later below) is implemented.

In this example, a vehicle 2 is travelling along a road 4. The vehicle 2 is a land-based, manned vehicle.

In this example, as the vehicle 2 travels along the road 4, at some point in time the vehicle 2 will pass a check-point 6. In this scenario, the check-point 6 is a particular point on the road 4.

In this example, a visible-light detecting camera, hereinafter referred to as "the camera B", an acoustic sensor 10, and a human observer, hereinafter referred to as "the human 12", are arranged to detect the presence of the vehicle 2 as it passes the check-point 6. In this example, the sensors (i.e. the camera 8, the acoustic sensor 10, and the human 12) are heterogeneous data sources. The terminology "heterogeneous"" is used herein to refer to two or more data sources that are independent and that produce data that is dissimilar to the other data sources. For example, heterogeneous' data sources may provide different terminology, data types, units of measurement, domains, scopes, and so on. Examples of different heterogeneous data types are binary, discrete, categorical, interval, probabilistic and linguistic data types.

In this scenario, the camera 8 captures images of the check-point 6. In this scenario, the images are captured at regular time intervals. The captured images are sent from the camera 8 to a base station 14. The images received by the base station 14 from the camera 8 are processed at the base station 14, as described in more detail later below with reference to FIGS. 2 to 6.

In this scenario, the acoustic sensor 10 captures sound from the proximity of the check-point 6. In this scenario, the sound recording of the check-point 6 is taken substantially continuously. The sound recording is sent from the acoustic sensor 10 to the base station 14 where it is processed, as described in more detail later below with reference to FIGS. 2 to 6.

In this scenario, the human 12 makes audio and visual observations of the check-point 6. In this scenario, the observations of the human 12 are taken at regular intervals. The observations are sent as text from the human 12 to the base station 14 where they are processed, as described in more detail later below with reference to FIGS. 2 to 6.

Figure 2:
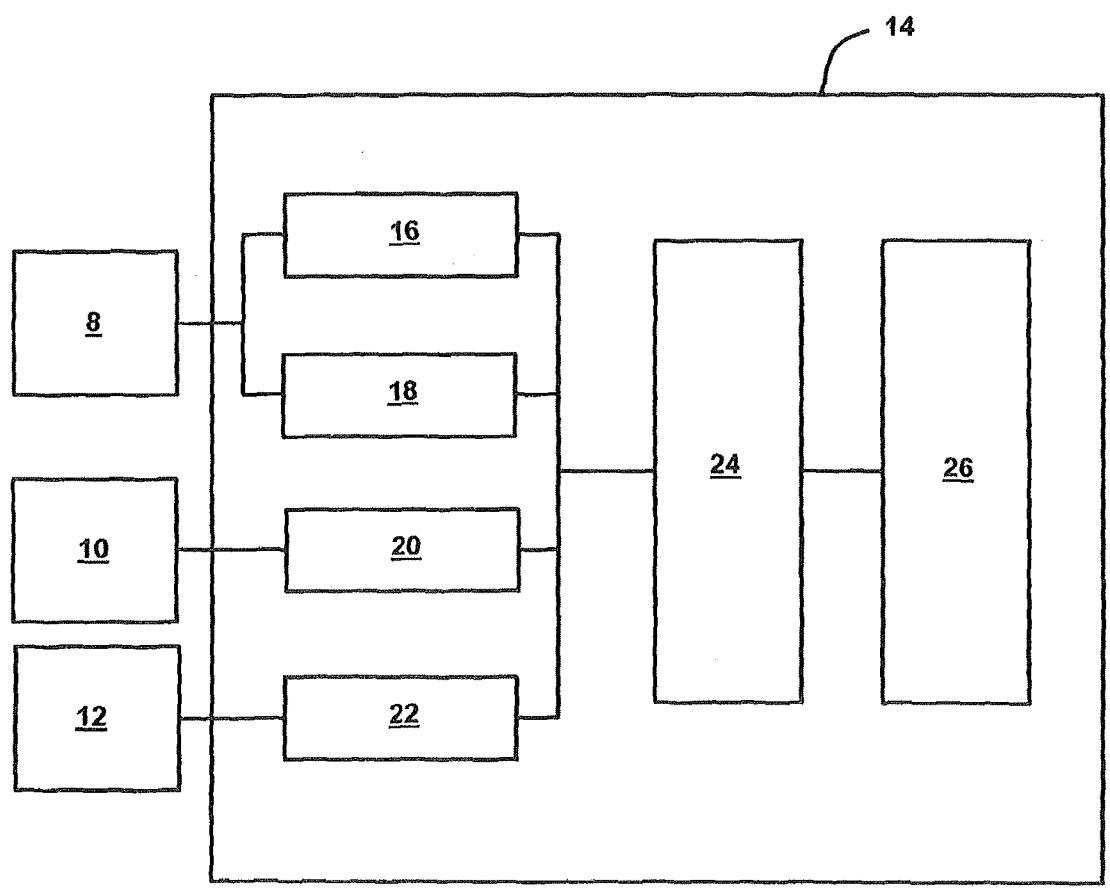
FIG. 2 is a schematic illustration of sensors and a base station used in the scenario of FIG. 1.

FIG. 2 is a schematic illustration of the sensors (i.e. the camera 8, the acoustic sensor 10, and the human 12), and the base station 14 used in this embodiment to implement information fusion method.

In this embodiment, the base station 14 comprises a first pre-processor 16, a second pre-processor 18, a third pre-processor 20, a fourth pre-processor 22, a processor for performing a data fusion method (hereinafter referred to as the "data fusion processor 24"), and a display 26.

In this embodiment, the first pre-processor 16 is connected to the camera 8. Also, the first pre-processor 16 is connected to the data fusion processor 24.

In this embodiment, in operation the first pre-processor 16 receives images of the check-point 6 from the camera 8. The first pre-processor 16 processes the received images. In particular, in this embodiment the first pre-processor 16 performs a conventional edge detection process on the received images. The processed images are then sent from the first pre-processor 16 to the data fusion processor 24.

In this embodiment, the second pre-processor 18 is connected to the camera 8. Also, the second pre-processor 18 is connected to the data fusion processor 24.

In this embodiment, in operation the second pre-processor 18 receives images of the check-point 6 from the camera 8. The second pre-processor 18 processes the received images. In particular, in this embodiment the second pre-processor 18 performs a conventional template matching process on the received images. The processed images are then sent from the second pre-processor 18 to the data fusion processor 24.

In this embodiment, the third pre-processor 20 is connected to the acoustic sensor 10. Also, the third pre-processor 20 is connected to the data fusion processor 24.

In this embodiment, in operation the third pre-processor 20 receives a sound recording of the check-point 6 from the acoustic sensor 10. The third pre-processor 20 processes the received sound recording. In particular, in this embodiment the third pre-processor 20 performs a conventional Fourier analysis of the sound waveform, e.g. to determine Fourier coefficients. The processed sound waveform is then sent from the third pre-processor 20 to the data fusion processor 24.

In this embodiment, the fourth pre-processor 22 receives an input from the human 12. Also, the fourth pre-processor 18 is connected to the data fusion processor 24.

In this embodiment, in operation the fourth pre-processor 22 receives the intelligence report (in the form of text) about the check-point 6 from the human 12. The fourth pre-processor 22 processes the received images. In particular, in this embodiment the fourth pre-processor 18 performs a conventional fixed field extraction process on the received text. The processed intelligence report is then sent from the fourth pre-processor 18 to the data fusion processor 24.

In this embodiment, in operation the data fusion processor 24 performs a data fusion process on the data received from the pre-processors 16, 18, 20, 22 as described in more detail later below with reference to FIGS. 4 to 6. The data received from by the data fusion processor 24 may be considered to be from a plurality of heterogeneous sources (i.e. the pre-processors 16, 18, 20, 22 may be considered to be heterogeneous data sources).

In this embodiment, prior to processing the data received from the sensors 8, 10, 12, the data fusion processor 24 is trained using a set of training data as described below with reference to FIG. 3. After the data fusion processor 24 has been trained using the training data, data received from the sensors 8, 10, 12 may be processed by the data fusion processor 24. The trained data fusion processor 24 processes received data by performing the data fusion process described in more detail later below with reference to FIGS. 4 to 6.

The data fusion processor 24 is connected to a display 26. An output from the data fusion processor 24 is sent from the data fusion processor 24 to the display 26 where it is displayed to an operator (not shown in the Figures).

The following information is useful for understanding the process of training the data fusion processor 24 (described in more detail later below with reference to FIG. 3), and a data fusion process (described in more detail later below with reference to FIGS. 4 to 6). These methods will be described in greater detail after the following information. Further information regarding Relevance Vector Machines (RVM) can be found in "*Sparse Bayesian learning and the Relevance Vector Machine*", M. E. Tipping, Journal of Machine Research 1, pages 211-244, June 2001, which is incorporated herein by reference.

In this embodiment, a set of possible input vectors (i.e. vectors comprising input data points) for the data fusion processor is:

$$X = \{x_1, \ldots, x_Q\}$$

where: $x_1, \ldots, x_Q$ are input vectors for the data fusion processor 24.

In this embodiment, an input vector is a heterogeneous feature vector that that describes a scenario, e.g. the scenario of FIG. 1. Also, in this embodiment, an input vector is a concatenation of feature vectors from each of the data sources in the scenario.

In this embodiment, each input vector contains the same sequence of data types. This advantageously tends to facilitate the comparison of individual features of different input vectors, e.g. using distance measures tailored to the specific types of data In this embodiment, each feature vector is complete and does not contain missing values.

In this embodiment, an input vector comprises inputs for the data fusion processor 24 corresponding to each of the pre-processors 16, 18, 20, 22.

Also, in this embodiment, each input vector has dimension M.

In this embodiment, a set of training input data $X_{tr} \subseteq X$ is:

$$X_{tr} = \{x_i\}_{i=1}^{N}$$

where: N is the number of input vectors in the training dataset $X_{tr}$.

In this embodiment, each of the input vectors $x_i$ in the training data $x_{tr}$ corresponds to a measured (noisy) output $t_i$ of the data fusion processor 24.

In this embodiment, the measured outputs $t_i$ are Gaussian distributed with zero mean. In this embodiment, the measured outputs $t_i$ are samples of the following non-linear model:

$$t_i = y(x_i) + \epsilon_i$$

where: y is a function of X (i.e. y is an output function); and
$\epsilon$ is a noise component of the measurement (assumed to be Normally distributed with mean zero and standard deviation $\sigma^2$ in this embodiment).

In this embodiment, the output function $t_i$ is a regressor over arbitrary functions of the input. However, in other embodiments the output function $t_i$ is a different function. For example, the output can be mapped to a value in the range [0,1] via the sigmoid function. This tends to facilitate binary classification. In such an embodiment, the regressor function (i.e. the output function y) may be mapped onto, f, onto $t \in [0, 1]$ via the sigmoid function, $g(y(x))$:

$$g(y(x)) = \frac{1}{1 + \exp(-sy(x))}$$

where s>0 is a sigmoid sensitivity. Also, the latent function may be defined so that it has a direct probabilistic interpretation, e.g. $P(t=1|x) = g(y(x))$ An advantage provided by the use of the sigmoid function in classification processes is that it tends to facilitate near stepwise changes in probability across class boundaries whilst implementing only smoothly varying functions in the latent space. Thus, relatively simple kernels (i.e. covariance functions) such as the squared-exponential function may be used (as described in more detail later below), without defining change-points or declaring kernel non-stationarities at the class boundaries.

Further information on the sigmoid function, its uses, and the extension of Gaussian Process regressors in classification processes can be found in "*Gaussian Processes for Machine Learning*", C. E. Rasmussen and C. K. I. Williams, The MIT Press, 2006, which is incorporated herein by reference.

In this embodiment, the process of training the data processor 24 comprises learning, or inferring, parameters of the output function y(X).

In this embodiment, the output function y(X) is modelled as a Gaussian Process. Also, a covariance of the output function is a kernel value.

Gaussian Processes advantageously tend to provide a principled Bayesian approach to uncertainty. Furthermore, an intuitive interpretation on the kernel (i.e. the covariance of the output function) is provided.

A Gaussian Process is described by its mean and covariance function (kernel).

In this embodiment, the Gaussian process is for inferring/predicting an output distribution for new data samples. Also, the Gaussian Process is performed to infer a relevance indication for the data from the different data sources and/or pre-processors. In other embodiments, a different regression technique is used instead of or in addition a Gaussian Process. For example, in other embodiments a least-squares regression technique is used.

In this embodiment, the following equation holds:

$$y(X_{tr}) = N\left(0, \sum_{j=1}^{N} w_j^2 K_j(X_{tr}, X_{tr})\right)$$

where: $w = (w_1, \ldots w_M)^T$ is a vector of adjustable parameters, hereinafter referred to as "weights". In this embodiment, the weights appear linearly. Also, in this embodiment, an objective of the training process, described in more detail later below with reference to FIG. 3, is to estimate "good" values of these weights; and $K_j$ is a kernel function. The set of kernel functions, in effect, provide a basis for the output function. The matrix $K(X_{tr}, X_{tr})$ denotes the joint prior distribution covariance of the function at inputs $X_{tr}$. In this embodiment, this covariance matrix has elements:

$$K(x_i, x_j) = \text{Cov}(y(x_i), y(x_j))$$

In this embodiment, there is one basis function (kernel function) corresponding to inputs from each of the pre-processors 16, 18, 20, 22. In this embodiment, these kernel functions are distinct (i.e. different from one another). In other words, a first kernel $K_1$ is applied to input vector features from the first pre-processor 16, a second kernel $K_2$ is applied to input vector features from the second pre-processor 18, a third kernel $K_3$ is applied to input vector features from the third pre-processor 20, and a fourth kernel $K_4$ is applied to input vector features from the fourth pre-processor 22. Also, the first second, third and fourth kernels are different from each other.

In this embodiment, each of the kernels $K_1$-$K_4$ is selected such that its type (e.g. categorical, semantic etc.) is dependent upon the type of features generated by the relevant respective pre-processor and the characteristics of space of those features (e.g. smooth, continuous etc.).

For example, $X = \{x_1, \ldots, x_Q\}$ is a set of Q input vectors $X_i$ for the data fusion processor 24. $\rho_j (x_k)$ is the jth data point (or feature) of the kth input vector. Also, $y(x_k)$ is a real valued output for the kth input vector. Then $K_j$ is a kernel function for the jth feature. For example, a common kernel is the Squared-Exponential kernel:

$$K_{SEj}(x_s, x_t) = \mu_j \exp\left(-\frac{(\rho_j(x_s) - \rho_j(x_t))^2}{L_j}\right)$$

where L≥0 and μ≥0 are hyperparameters. These are called the input scale and the output scale respectively. They govern how correlated the output values are over neighbouring inputs. In this embodiment, the input scale L is learned from training data.

A further example of a kernel is the Nominal Kernel:

$$K_{N_j}(x_s, x_t) = \mu_j \exp\left(-\frac{I(\rho_j(x_s), \rho_j(x_t))}{L_j}\right)$$

where I is an indicator function, i.e. I(A,B)=1 if A and B are the same, and I=0 otherwise.

A further example of a kernel is the Rank Kernel:

$$K_{R_j}(x_s, x_t) = \mu_j \exp\left(-\frac{M(\rho_j(x_s), \rho_j(x_t))}{L_j}\right)$$

where, M is a rank distance (i.e. an absolute difference between the input rankings). In other words, for any ranked input A, R(A) indicates the rank of A within the rank order, and the rank distance is M(A, B)=|R(B)−R(A)|.

In this example, the kernel function is a nonlinear mapping from an input vector to the output function. In this example, $L_j$ moderates the similarity between the features of the input vectors.

In general, if $D_j(\rho_j(x_s), \rho_j(x_t))$ is a measure of the dissimilarity between the input vectors $x_s$ and $x_t$ in feature space j then:

$$K_j(x_s, x_t) = G(D_j(\rho_j(x_s), \rho_j(x_t)))$$

given some conventional kernel G. Typically, K is a valid kernel provided that it induces a positive definite matrix over all $x_s$ and $x_t$.

Examples of valid kernels are included in the paper "*A survey of kernels for structured data*", T. Gärtner, 5(1):49-58, 2003, which is incorporated herein by reference. An example of a valid kernel is the squared exponential kernel.

As mentioned above, in this embodiment a kernel value is interpreted as a covariance. Also, an output function value is interpreted as a Gaussian Process. Thus, when an output function is generated from multiple features then:

$$y(X_{tr}) = N\left(0, \sum_{j=1}^{M} w_j^2 K_j(X_{tr}, X_{tr})\right)$$

where $w_j$ are the mixing coefficients or weights of a mixture of covariance matrices:

$$K(X_{tr}, X_{tr}) = \sum_{j=1}^{M} w_j^2 K_j(X_{tr}, X_{tr}).$$

In this embodiment, Kernels can be combined by addition (e.g. as in the above equation). However, in other embodiments, kernels may be combined in a different way. For example, in other embodiments kernels are combined by multiplication, i.e.:

$$K(X_1, X_2) = \prod_{j=1}^{M} K_j(X_1, X_2)^{w_j^2}$$

In general, a kernel sum tends to be particularly appropriate for combining disjunctive inputs for which different outputs are correlated if any element/features of the input features vectors, e.g. positional features, are close.

A kernel product tends to be more appropriate when outputs are correlated only if the entire input vectors, i.e. "scenarios" are close.

Kernels may also be combined to form kernels over entire feature vectors. For example, a feature kernel, $K_x(x_1, x_2)$, measures the closeness of two feature vectors, $x_1$ and $x_2$. Firstly, appropriate kernels, $K_i$, are selected for each feature, $\rho_i(x)$. Secondly, the individual kernels are combined, for example, using the product rule into a single feature vector kernel:

$$K_x(x_1, x_2) = \prod_{i} K_i(\rho_i(x_1), \rho_i(x_2))$$

As mentioned above, in this embodiment the measured outputs $t_i$ are samples of the linear model $t_i(x_i) = y(x_i) + \epsilon_i$.

Thus, when the training data $X_{tr}$ (i.e. a subset of all possible data X) are observed, the mean of the output function y over all data X is:

$$\hat{y}(X) = \frac{\sum_{j=1}^{M} w_j^2 K_j(X, X_{tr})}{\sum_{j=1}^{M} w_j^2 K_j(X_{tr}, X_{tr}) + \sigma^2 I} t(X_{tr})$$

Thus, writing the contribution to the output function from feature j as the basis function:

$$\hat{\phi}_j(X) = \frac{w_j K_j(X, X_{tr})}{\sum_{j=1}^{M} w_j^2 K_j(X_{tr}, X_{tr}) + \sigma^2 I} t(X_{tr}) \quad \text{Equation 1}$$

Thus:

$$\hat{y}(X) = \sum_{j=1}^{M} w_j \hat{\phi}_j(X)$$

As described in more detail later below, in this embodiment, the weights $w_j$ can be set using an Expectation Maximisation (EM) algorithm, such as that described in "*Sparse Bayesian learning and the Relevance Vector Machine*", M. E. Tipping, Journal of Machine Research 1, pages 211-244, June 2001.

In this embodiment, the weights $w_j$ are Gaussian distributed, $$w_j \sim N\left(0, \frac{1}{\alpha_j}\right).$$

Also, in this embodiment, an EM algorithm is implemented to find the most likely values for α given the measured data $t(X_{tr})$.

In this embodiment, the basis functions $\hat{\phi}_j$ are learned from the training data using the process described in more detail later below with reference to FIG. 3.

In this process, $\hat{\phi}_j$ a function of the weights $w_j$. To accommodate this, the term $\hat{\phi}_j$ in Equation 1 above is evaluated using the following approximation (that uses the mean of the weights):

$$\hat{\phi}_j(X) = \frac{\mu_j K_j(X, X_{tr})}{\sum_{j=1}^{M} \mu_j^2 K_j(X_{tr}, X_{tr}) + \sigma^2 I} t(X_{tr}) \qquad \text{Equation 2}$$

In this embodiment, the posterior covariance of the weights tends to be advantageously small.

Figure 3:
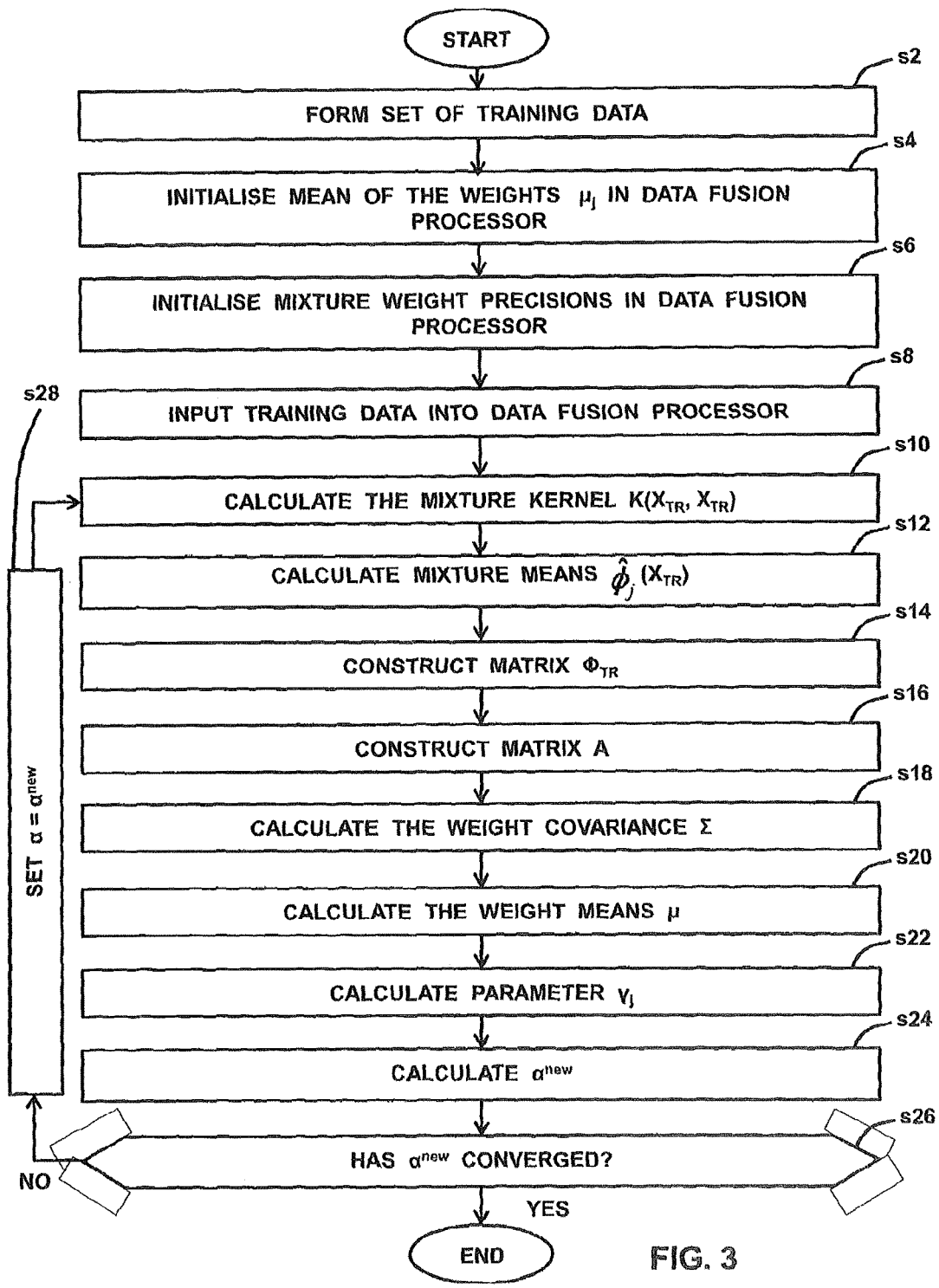
FIG. 3 is a process flow chart showing certain steps of a method training a data fusion processor using a set of training data.

FIG. 3 is a process flow chart showing certain steps of a method training the data fusion processor 24 using a set of training data.

At step s2, a set of training data for the data fusion processor 24 is formed.

In this embodiment, the set of training data comprises the set of input vectors $X_{tr} = \{x_i\}_{i=1}^{N}$ and corresponding measured outputs $\{t_i\}_{i=1}^{N}$ (which are used as labels for the input vectors in the training data). In this embodiment, each of the input vectors $x_i$ has dimension M. Moreover, in this embodiment each input vector $x_i$ comprises distinct inputs for the data fusion processor 24 corresponding to each of the pre-processors 16, 18, 20, 22.

At step s4, in the data fusion processor 24, each of the means of the weights $w_j$, i.e. each value of $\mu_j$, for j=1, . . . , M, is initialised to a non-zero value.

At step s6, in the data fusion processor 24, each of the mixture weight precisions $\alpha_j$ for j=1, . . . , M, is initialised to small values.

At step s8, the training data $\{x_i, t_i\}_{i=1}^{N}$ is input into the data fusion processor 24.

At step s10, using the input training data, the data fusion processor 24 determines the mixture kernel, i.e. the mixture of covariance matrices:

$$K(X_{tr}, X_{tr}) = \sum_{j=1}^{M} \mu_j^2 K_j(X_{tr}, X_{tr})$$

where M is the number of features in the N input vectors (i.e. the dimension of each input vector).

In this embodiment, each of the features in an input vector for the data fusion processor 24 correspond to (i.e. are an output of) one of the pre-processors 16, 18, 20, 22.

Also, in this embodiment there is one kernel function for each of the pre-processors 16, 18, 20, 22.

In this embodiment, the kernel function corresponding to a particular pre-processor 16, 18, 20, 22 is applied to the input features of the input vector that correspond to that pre-processor.

For example, each input vector $x_i$ comprises features from each of the pre-processors 16, 18, 20, 22, i.e.:

$$x_i = (a_i, b_i, c_i, d_i)$$

where: $a_i$ is the component of the input vector $x_i$ from the first pre-processor 16;
$b_i$ is the component of the input vector $x_i$ from the second pre-processor 18;
$c_i$ is the component of the input vector $x_i$ from the third pre-processor 20; and
$d_i$ is the component of the input vector $x_i$ from the fourth pre-processor 22.

Then, in this example:

$$K(X_{tr}, X_{tr}) = \sum_{j=1}^{a} \mu_j^2 K_1(a, a) + \sum_{j=a+1}^{a+b} \mu_j^2 K_2(b, b) + \sum_{j=a+b+1}^{a+b+c} \mu_j^2 K_3(c, c) + \sum_{j=a+b+c+1}^{a+b+c+d=M} \mu_j^2 K_4(d, d)$$

where: $K_1$ is a kernel for applying to features of the input vector from the first pre-processor 16;
$K_2$ is a kernel for applying to features of the input vector from the second pre-processor 18;
$K_3$ is a kernel for applying to features of the input vector from the third pre-processor 20;
$K_4$ is a kernel for applying to features of the input vector from the fourth pre-processor 22;
a is a set of vectors $a = \{a_i\}_{i=1}^{N}$, where a is a component of the input vector $X_i$ from the first pre-processor 16. Each vector $a_i$ has dimension a;
b is a set of vectors $b = \{b_i\}_{i=1}^{N}$, where $b_i$ is a component of the input vector $x_i$ from the second pre-processor 18. Each vector $b_i$ has dimension b;
c is a set of vectors $c = \{c_i\}_{i=1}^{N}$, where $c_i$ is a component of the input vector $x_i$ from the third pre-processor 20. Each vector $c_i$ has dimension c; and
d is a set of vectors $d = \{d_i\}_{i=1}^{N}$, where $d_i$ is a component of the input vector $x_i$ from the fourth pre-processor 22. Each vector $d_i$ has dimension d.

In this embodiment, the kernel functions $K_1$, $K_2$, $K_3$, and $K_4$ are each different and distinct from one another. However, in other embodiments two or more of these kernels are the same kernel function.

At step s12, using the input training data and the mixture kernel determined at step s10 above, the data fusion processor 24 determines the mixture means:

$$\hat{\phi}_j(X_{tr}) = \frac{\mu_j K_j(X_{tr}, X_{tr})}{\sum_{j=1}^{M} \mu_j^2 K_j(X_{tr}, X_{tr}) + \sigma^2 I} t(X_{tr})$$

At step s14, an N×M matrix $\Phi_{tr}$ is constructed from the determined mixture means:

$$\Phi_{tr} = [\hat{\phi}_1(X_{tr}), \ldots, \hat{\phi}_M(X_{tr})]$$

At step s16, an M×M matrix A is constructed from mixture weight precisions $\alpha_j$ for j=1, . . . , M:

$$A = \text{diag}(\alpha_1, \ldots, \alpha_M)$$

At step s18, using the matrix $\Phi$ constructed at step s14 above and the matrix A constructed at step s16 above, an M×M "weight covariance" matrix $\Sigma$ is calculated. In this embodiment, $$\Sigma = [\Phi_{tr}^T \Phi_{tr}/\sigma^2 + A]^{-1}$$

At step s20, using the matrix $\Phi_{tr}$ constructed at step s14 above and the matrix $\Sigma$ Constructed at step s18 above, a vector of weight means $\mu$ is calculated. In this embodiment, $$\mu = \Sigma \Phi_{tr}^T t(X_{tr})/\sigma^2$$

At step s22, using the matrix $\Sigma$ constructed at step s18 above and the mixture weight precisions $\alpha_j$ for j=1, . . . , M, defined at step s6 above, a vector $\gamma$ is calculated. In this embodiment, $$\gamma_j = 1 - \alpha_j \Sigma_{jj} \text{ for } j=1, \ldots, M$$

At step s24, new values for the mixture weight precisions $\alpha_j$ for j=1, ..., M are determined. The notation $\alpha_j^{new}$ will be used to denote the new values for the mixture weight precisions. In this embodiment, $$\alpha_j^{new} = \gamma_j/\mu_j^2$$

At step s24, it is determined whether the values for the mixture weight precision values have converged.

In this embodiment, if the difference between the new values for the mixture weight precisions and the previous values for the mixture weight precisions is below a predetermined threshold, then it is determined that the mixture weight precisions have converged. Otherwise, it is determined that the mixture weight precisions have not converged If, at step s24, it is determined that the mixture weight precisions have converged, the method of training the data fusion processor 24 using a set of training data ends. In this case, values for the mixture weight precisions $\alpha_j$, and therefore distributions for the mixture weights $w_j$, have been determined.

However, if, at step s24, it is determined that the mixture weight precisions have not converged, the method proceeds to step s28.

At step s28, the values the mixture weight precisions are updated to be the new values for the mixture weight precisions $\alpha_j^{new}$ (determined at step s24).

After step s24, the method proceeds back to step s10, where the data fusion processor 24 determines the mixture kernel (using the vector of weight means μ calculated at step s20 above).

Thus, in this embodiment steps s10 to s28 are iterated (updating values for the mixture weight precisions and the weight means at each iteration) until the mixture weight precisions have converged.

Thus, a method training the data fusion processor 24 using a set of training data is provided.

The above described method training the data fusion processor 24 advantageously provides learned kernel parameters to be used by the data fusion processor 24 when processing actual test data from the sensors 8, 10, 12. Furthermore, relevant combinations of weights (i.e. which combinations of basis functions are relevant) for the training data set are also learnt. Furthermore, a mapping between the feature space (i.e. the space of the input vectors) and the target space (i.e. the space of the measured outputs of the data fusion processor 24) is learnt.

Once the data fusion processor 24 has been trained one or more data fusion processes may be performed.

In this embodiment, a data fusion process of inferring a predictive distribution for a measured output $t_i$ from the data fusion processor 24 is performed. Also, in this embodiment, a data fusion process comprising processing new sensor data and identifying the most significant pre-processor and data source with respect to the measured output corresponding to the new data is performed.

The terminology "significant/relevant feature" is used herein to refer to the feature or features in an input vector that lead to the most accurate prediction of the output function. Also, the terminology "significant/relevant pre-processor" is used herein to refer to the pre-processor or pre-processors from which a significant/relevant feature is received by the data fusion processor 24. Also, the terminology "significant/relevant data source" is used herein to refer to a data source that is an input to a significant/relevant pre-processor or pre-processors.

The process of inferring a predictive distribution for a measured output of the data fusion processor 24 is described in more detail later below with reference to FIGS. 4 and 5.

The process of processing new sensor data and identifying a most significant pre-processor and data source is described in more detail later below with reference to FIG. 6.

Figure 4:
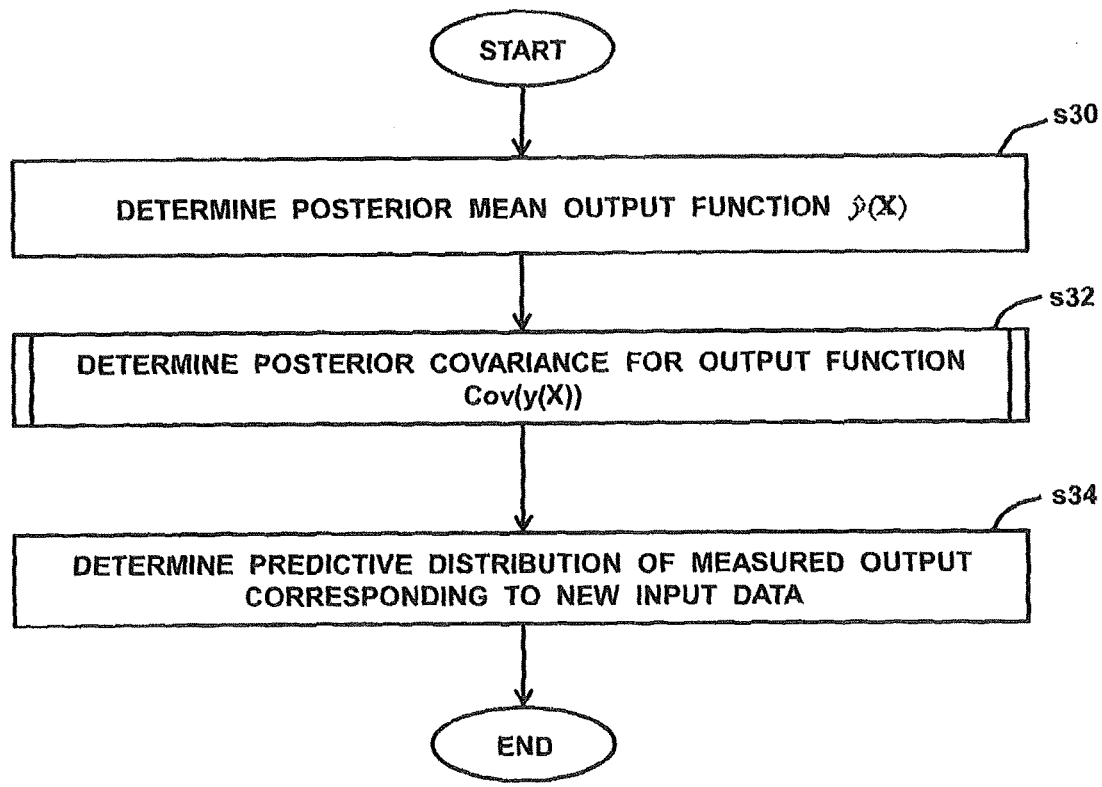
FIG. 4 is a process flow chart showing certain steps of process of inferring a predictive distribution for a measured output of the data fusion processor.

FIG. 4 is a process flow chart showing certain steps of process of inferring a predictive distribution for a measured output.

In this embodiment, the process of FIG. 4 comprises inferring the posterior output function y(X) over the set of all possible input data X.

At step s30, a posterior mean for the output function (i.e. a mean for the output function over all possible input data) is determined.

In this embodiment, the posterior mean of the output function (denoted ŷ(X)) is determined using Equation 1 and 2 above. In this embodiment the posterior mean for the output function is:

$$\hat{y}(X) = \sum_{j=1}^{M} w_j \hat{\phi}_j(X)$$

where:

$$\hat{\phi}_j(X) = \frac{\mu_j K_j(X, X_{tr})}{\sum_{j=1}^{M} \mu_j^2 K_j(X_{tr}, X_{tr}) + \sigma^2 I} t(X_{tr})$$

At step s32, a posterior covariance for the output function (i.e. a covariance for the output function over all possible input data) is determined.

In this embodiment, the posterior covariance of the output function (denoted Cov(y(X))) is determined using a process described in more detail later below with reference to FIG. 5.

At step s34, a predictive distribution for a measured output corresponding to the new data is determined using the posterior mean and the posterior covariance for the output function determined at step s32 and s34 respectively.

In this embodiment, the predictive distribution for the measured output is:

$$t(X) \sim N(\hat{y}(X), \text{Cov}(y(X)))$$

Thus, predictions about the output of the data fusion 24 that would be measured if the new data were to be measured (by the sensors 8, 10, 12) may be made.

Figure 5:
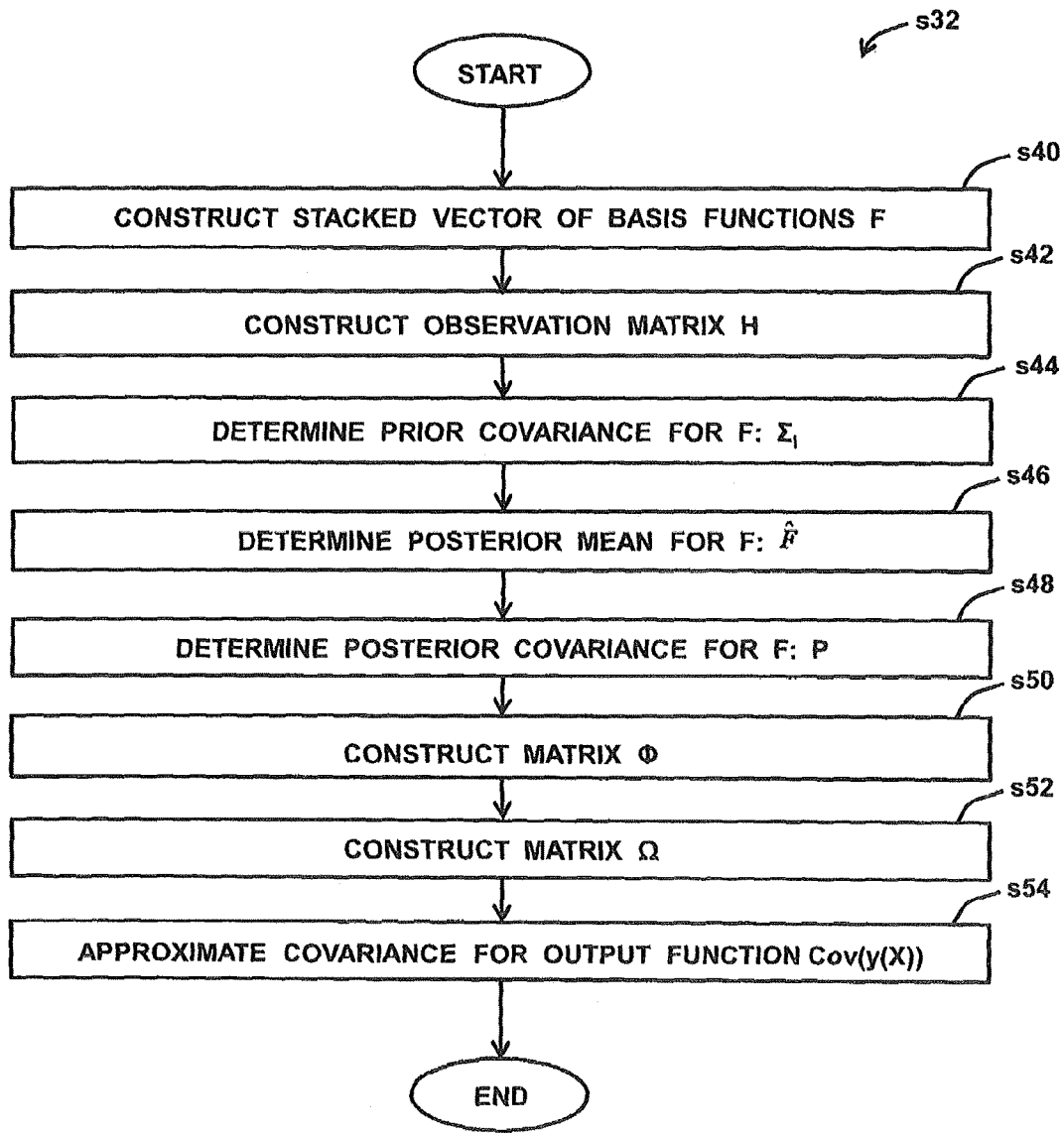
FIG. 5 is a process flow chart showing certain steps of the process of performing step s34 of the process of FIG. 4.

FIG. 5 is a process flow chart showing certain steps of the process of determining the posterior covariance of the output function performed at step s34 above.

At step s40, a vector of stacked basis functions F is constructed.

In this embodiment, the vector F is:

$$F = \begin{pmatrix} \phi_1(X) \\ \vdots \\ \phi_M(X) \end{pmatrix}$$

At step s42, an "observation matrix" H is constructed.
In this embodiment, the observation matrix H is:

$$H = [w_1 C, \ldots, w_M C]$$

Where $w_1, \ldots, w_M$ are the weights, and C is an N×M indicator matrix (i.e. $C_{ij}=1$ only if the ith observed/training input vector is identical to the jth inferred input vector, and is zero elsewhere).

At step s44, a prior covariance for the vector F is determined.

In this embodiment, the prior covariance (denoted $\Sigma_I$) is determined using the following formula:

$$\Sigma_I = \begin{pmatrix} K_1(X,X) & 0 & \ldots \\ \vdots & \vdots & \vdots \\ \ldots & \ldots & K_M(X,X) \end{pmatrix}$$

At step s46, using the Kalman Filter equations, a posterior mean for the vector F is determined. Further information on the Kalman Filter equations can be found in "*Stochastic Models, Estimation, and Control*", Maybeck, P. S. (1979). Mathematics in Science and Engineering. 141-1 New York: Academic Press, which is incorporated herein by reference.

In this embodiment, the posterior mean (denoted $\hat{F}$) is determined using the following formula:

$$\hat{F} = Kt(X)$$

where K is a Kalman gain:

$$K = \Sigma_I H^T [H\Sigma_I H^T + \sigma^2 I]^{-1}$$

where I is an identity matrix.

At step s48, using the Kalman Filter equations, a posterior covariance for the vector F is determined.

In this embodiment, the posterior covariance (denoted P) is determined using the following formula:

$$P = (I-KH)\Sigma_I$$

At step s50, a matrix $\Phi = [\hat{\phi}_1(X), \ldots, \hat{\phi}_M(X)]$ is constructed.

At step s52, a matrix $\Omega = [w_1 I, \ldots, w_M I]$ is constructed.

At step s54, the posterior covariance of the output function is approximated as:

$$\text{Cov}(y(X)) = \Omega P \Omega^T + \Phi \Sigma_I \phi^T$$

Thus, the process of determining the posterior covariance of the output function (step s34 of the process of FIG. 4) is provided.

Figure 6:
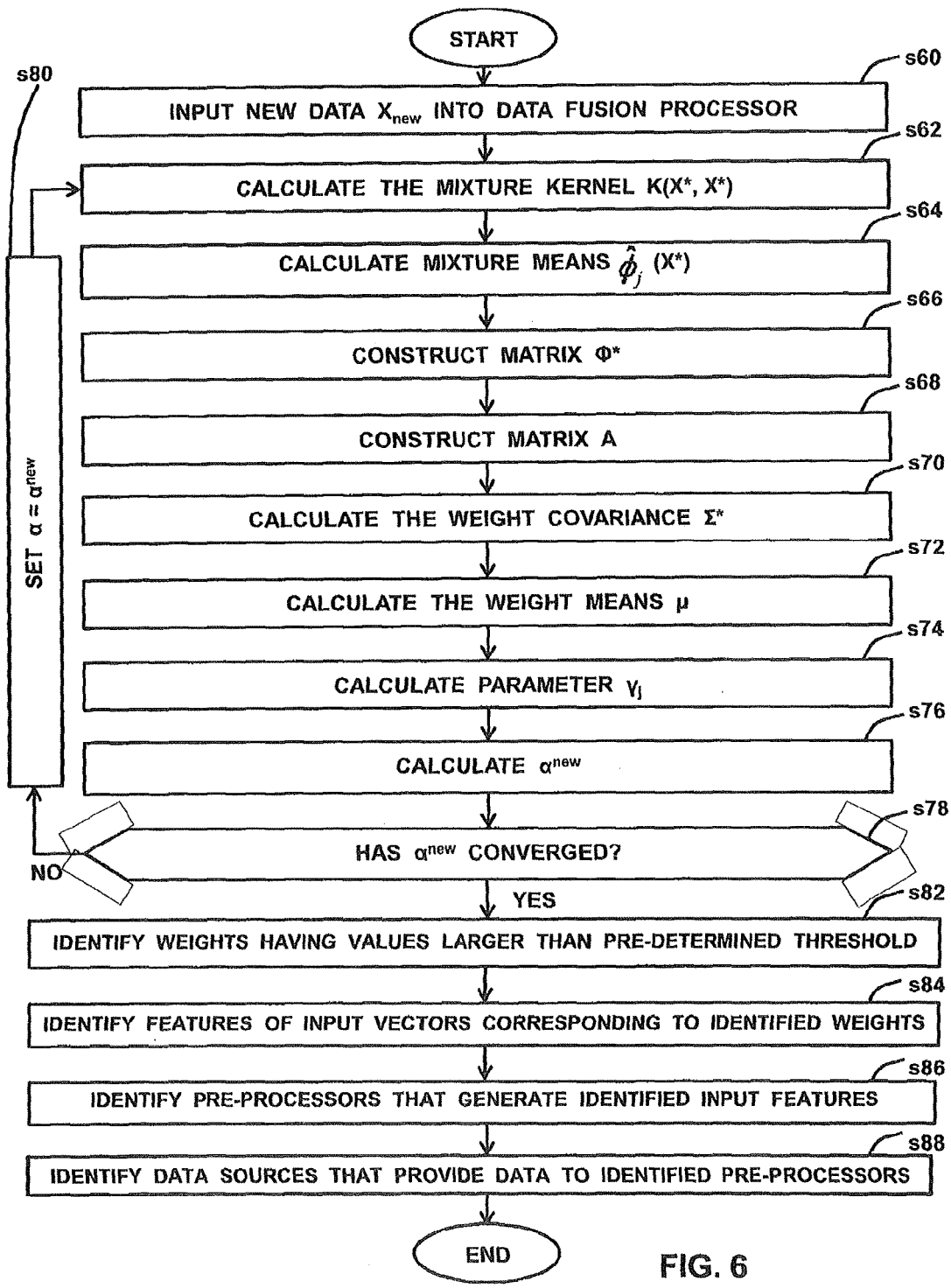
FIG. 6 is a process flow chart showing certain steps of a method of processing new sensor data and identifying a most significant pre-processor and data source depending on that new sensor data.

FIG. 6 is a process flow chart showing certain steps of a method of processing new sensor data. In this embodiment, this method comprises identifying the most significant/relevant features in the input vector, identifying a most significant/relevant pre-processor, and identifying a most significant/relevant data source depending on that new sensor data.

At step s60, after the data fusion processor has been trained as described above with reference to FIG. 3, further data (from the camera 8, the acoustic sensor 10, and/or the human 12 that has been received at the base station 14 and processed by the relevant pre-processor 16, 18, 20, 22) is input into the data fusion processor 24. This data may be conveniently referred to as "new data" and denoted $X_{new}$. This new data is a vector in the set of possible input vectors $X = \{x_1, \ldots, x_Q\}$. Moreover, in this embodiment this new data is not a vector in the set of training input data $X_{tr}$.

A set comprising the new data and the training data is:

$$X^* = \{X_{new}, X_{tr}\}$$

In this embodiment, the process of FIG. 6 comprises iteratively updating the values of the mixture weight precisions $\alpha_1$ using the new data $X_{new}$ and making a decision regarding a most significant pre-processor and data source based on the updated values. The process of iteratively updating the mixture weight precisions in the method of FIG. 6 is similar to process of iteratively updating the mixture weight precisions in the method of FIG. 3. Thus, steps s62 to s80 of FIG. 6 are similar to steps s10 to s28 of FIG. 3.

At step s62, using the data set $X^*$, the data fusion processor 24 determines the mixture kernel, i.e. the mixture of covariance matrices:

$$K(X^*, X^*) = \sum_{j=1}^{M} \mu_j^2 K_j(X^*, X^*)$$

where M is the number of features in the N input vectors (i.e. the dimension of each input vector).

At step s64, using the data set $X^*$ and the mixture kernel determined at step s62 above, the data fusion processor 24 determines the mixture means:

$$\hat{\phi}_j(X^*) = \frac{\mu_j K_j(X^*, X^*)}{\sum_{j=1}^{M} \mu_j^2 K_j(X^*, X^*) + \sigma^2 I} t(X^*)$$

In this embodiment, mixture mean parameters are learned during training.

At step s66, an N×M matrix $\Phi^*$ is constructed from the determined mixture means:

$$\Phi^* = [\hat{\phi}_1(X^*), \ldots, \hat{\phi}_M(X^*)]$$

At step s68, an M×M matrix A is constructed from the mixture weight precisions $\alpha_j$ for $j=1, \ldots, M$, that result from performing the training process of FIG. 3 (i.e. the mixture weight precision values that the process of FIG. 3 converges to):

$$A = \text{diag}(\alpha_1, \ldots, \alpha_M)$$

At step s70, using the matrix $\Phi^*$ constructed at step s66 above and the matrix A constructed at step s68 above, an M×N "weight covariance" matrix $\Sigma^*$ is calculated. In this embodiment, $$\Sigma^* = [(\Phi^*)^T \Phi^* / \sigma^2 / \sigma^2 + A]^{-1}$$

At step s72, using the matrix $\Phi^*$ constructed at step s66 above and the matrix $\Sigma^*$ constructed at step s70 above, a vector of weight means μ is calculated. In this embodiment, $$\mu = \Sigma^* (\Phi^*)^T t(X^*) / \sigma^2$$

At step s74, using the matrix $\Sigma^*$ constructed at step s70 above and the mixture weight precisions $\alpha_j$ for $j=1, \ldots, M$, a vector γ is calculated. In this embodiment, $$\gamma = 1 - \alpha_j \Sigma^*_{jj} \text{ for } j=1, \ldots, M$$

At step s76, new values for the mixture weight precisions $\alpha_j$ for $j=1, \ldots, M$ are determined. As described above, the notation $\alpha_j^{new}$ is used to denote the new values for the mixture weight precisions. In this embodiment, $$\alpha_j^{new} = \gamma_j / \mu_j^2$$

At step s78, it is determined whether the values for the mixture weight precision values have converged.

In this embodiment, if the difference between the new values for the mixture weight precisions and the previous values for the mixture weight precisions is below a predetermined threshold, then it is determined that the mixture weight precisions have converged. Otherwise, it is determined that the mixture weight precisions have not converged If, at step s78, it is determined that the mixture weight precisions have not converged, the method of processing new sensor data and identifying a most significant pre-processor and data source proceeds to step s80.

However If, at step s78, it is determined that the mixture weight precisions have converged, the method proceeds to step s82.

At step s80, the values the mixture weight precisions are updated to be the new values for the mixture weight precisions $\alpha_j^{new}$ (determined at step s76).

After step s80, the method proceeds back to step s62, where the data fusion processor 24 determines the mixture kernel (using the vector of weight means calculated at step s72 above).

At step s82, after the values for the for the mixture weight precisions have converged, the one or more weights that have values larger than a pre-determined threshold value are identified.

For example, after updating the values of the for the mixture weight precisions using the new data $X_{new}$, a single weight $w_p$ is identified as being above a pre-determined threshold value.

In embodiments, in which products of kernels are used, as the input/length scale of a kernel in the product increases (i.e. tends towards infinity), that kernels tend to become increasingly irrelevant. Thus, in these embodiments, length scales below a certain threshold are identified.

At step s84, the feature(s) in the input vectors that correspond to the one or more weights (or length scales) identified at step s82 above are identified. For example, the pth feature corresponds to the weight $w_p$. Thus, in this example, the pth feature is identified.

At step s86, the pre-processor(s) that generate identified feature(s) of the input vector (i.e. the pre-processor that provides the identified feature(s) to the data fusion processor 24) is identified.

At step s88, the data source(s) (i.e. one or more of the sensors 8, 10, 12) that provides data to the pre-processor identified at step s42 is identified.

For example, in this embodiment, if the first pre-processor 16 or the second pre-processor 18 is identified at step s86 above, the camera 8 is identified at step s88. Also, if the third pre-processor 20, the acoustic sensor 10 is identified at step s88. Also, if the fourth pre-processor 22, the human 12 is identified at step s88.

Thus, a method by which new sensor data is processed and the one or more pre-processors and data sources that is most significant with respect to the output of the data fusion processor is provided.

Thus, the method by which new sensor data is processed, described above with reference to FIG. 6, tends to provide that a one or more significant/relevant pre-processors and/or corresponding data sources can be identified. Data from these identified pre-processor and data sources tends to produce the most accurate predictions of the output function.

This automatic identification of significant/relevant pre-processors and/or data sources tends to facilitate the detection irrelevant data. Such irrelevant data may be excluded so as to increase the accuracy of the predictions of the output function.

The identification of relevant, or irrelevant, input features tends to be particularly important when performing a classification process (e.g. when classifying a state for a scenario using heterogeneous data measured for that scenario). Uncertainty tends to be increased if irrelevant features are included in an input feature vector. For example, different feature values for irrelevant features may increase the distance between, otherwise close, feature vectors.

Also, excluding relevant features tends to increase uncertainty. For example, subtle distinctions between classes may be lost if relevant data is excluded.

The identification of relevant features in an input/feature vector is a result of the method by which new sensor data is processed by the data fusion processor 24, which is described above with reference to FIG. 6.

As described in more detail in "*Bayesian Learning for Neural Networks*", R. M. Neal, ser. Lecture Notes in Statistics 118, New York: Springer, 1996, which is incorporated herein by reference, an irrelevant feature tends to have a relatively large input scale L. For relatively large input scales, the covariance will be independent of that input, effectively removing it from the feature vector (i.e. if a feature has a relatively large input scale, its kernel function will tend to be relatively flat, and so this kernel will have little or no impact of the product of kernels).

An advantage provided by the above described system and methods is that it tends to be possible to process and compare data from a plurality of heterogeneous sources. The combination, analysis and visualisation of data from a plurality of heterogeneous sources tend to be facilitated. A combination of heterogeneous data into a single coherent view tends to be advantageously provided.

A further advantage is that an indication of the most significant and reliable data source and/or pre-processing method for that data source, dependant on the measured sensor data, tends to be provided. In other words, several algorithms may claim to pre-process data in the "best" way. The above described method tends to provide an automatic and unbiased way of determining the most relevant pre-processor.

A further advantage provided by the implementation of Gaussian Processes is the need to specify a priori the basis functions for the classical Relevance Vector Machine tends to be advantageously eliminated.

Moreover, the use of Gaussian Processes tends to provide that, when training the data fusion processor (as described in more detail above with reference to FIG. 3), uncertainty in the output function y(X) is accounted for far away from the training input vectors $X_{tr}$. This is in contrast to the classical Relevance Vector Machine approach.

An advantage provided by the method of training the data fusion process using the training data (as described in more detail above with reference to FIG. 3) is that relevant combinations of data features are automatically learnt. This advantageously tends to reduce the workload on-a (human) data analyst.

An advantage provided by the above described system and methods is that training of the data fusion process may be carried out "off-line", i.e. in advance of the system and method being implemented on actual test data. The system and method may advantageously be implemented in situ on actual test data to provide real-time analysis of data from heterogeneous sources.

A further advantage provided by the above described system and method is that an Automatic Relevance Detection facility tends to be provided.

The above described system and method tends to be advantageous flexible, and robust.

Apparatus, including the data fusion processor 24, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 3 to 6 and described above may be omitted or such process steps may be performed in differing order to that presented above and shown in the Figures. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the information fusion method is implemented in the scenario of FIG. 1. In particular, specific activity in the vicinity of a check-point and in an urban environment is measured. However, in other embodiments the information fusion method is implemented in a different scenario. In other embodiment, different activities or patterns are observed and these patterns are labelled according to their type (e.g. normal/abnormal, benign/hostile etc.) Example scenarios include activity in a town or activity on a computer network.

In the above embodiments, the vehicle is a land-based, manned vehicle that travels along a road. At some point in time the vehicle passes the check-point (a particular point on the road). However, in other embodiments, the vehicle is a different type of entity, for example a different type of vehicle (e.g. a manned or unmanned air-vehicle). Also, in other embodiments there is a different number of vehicles.

In the above embodiments, the sources of the data being processed are the camera, the acoustic sensor, and the human. These data sources are heterogeneous data sources. However, in other embodiments there are a different number of data sources. Also, in other embodiments, any of the data sources may be different type of data sources, e.g. a satellite capturing images of a scene. Also, in other embodiments some of the data sources may not be heterogeneous data sources (they may be "homogeneous, i.e. they may be the same type of sensor etc.) Homogeneous data sources may, for example, be pre-processed differently be different pre-processors.

In the above embodiments, data is passed to, and processed at, a single base station, i.e. at a central processor. However, in other embodiments the data may be processed by a different number of processors that are remote from one another.

In the above embodiments, the base station comprises four pre-processors. The first and second pre-processors process data from the camera, the third pre-processor processes data from the acoustic sensor, and the fourth pre-processor processes data from the human. However, in other embodiments the base station comprises a different number of pre-processors. Furthermore, in other embodiments any number of pre-processors may process data a particular data source. Furthermore, in other embodiments a pre-processor may process data from any number of data sources.

In the above embodiments, the pre-processors process the data they receive as described in more detail above with reference to FIG. 2 (e.g. the first pre-processor performs a conventional edge detection process on images received from the camera). However, in other embodiments one or more of the pre-processors performs a different data processing process.

In the above embodiments, the output from the data fusion processor is sent from the data fusion processor to the display where it is displayed to an operator. However, in other embodiments an output of the data fusion processor (i.e. an output of a data fusion process) is sent from the data fusion processor for use by a different system.

In the above embodiments, a particular kernel is used to process data from a particular pre-processor (and thus from a particular data source). This tends to provide that data from a particular data source (or pre-processor) is processed using a unique combination of kernels with respect to data from the other data sources (or pre-processors). This tends to facilitate the identification of relevant/significant data-sources (or pre-processor). However, in other embodiments a particular kernel may be used to process data from more than one pre-processors (and thus from more than one data source) such that the data from a particular data source (or pre-processor) is processed using a unique combination of kernels with respect to data from the other data sources (or pre-processors).

In the above embodiments, data is represented as a linear combination of kernels. These kernels are then interpreted as covariances of Gaussian Processes. However, in other embodiments, the kernelised data is interpreted or processed differently, e.g. not using Gaussian Process. For example, in other embodiments the kernelised data may be used to infer relevance (e.g. of a data source or pre-processing method) by implementing a Linear Basis Model (LBM) approach, or Radial Basis Function (RBF) approach. Advantageously, using an LBM approach to process the kernelised data tends not to require the inversion of covariance matrices. Thus, it tends to be possible to use efficient Variational Bayes techniques to marginalise over kernel weights and/or input scales.

The use of LBM to process kernelised data advantageously tends to provide that large datasets may be processed in a more computationally efficient manner compared to if Gaussian Processes were used. This tends to be due to the LBM approach not involving the inversion of (large) covariance matrices. However, the above described Gaussian Processes approach tends to produce more accurate results than the LBM approach.

A function may be written as:

$$f(x) = \sum_i w_i K(x_i) + \varepsilon_x$$

Where: $\varepsilon_x$ is normal independent and identically distributed, $\varepsilon_x \sim N(0, \tau)$;
$w_i$ are weights; and
$x_i$ are inputs (or features).

The form of the basis kernel, $K(\cdot)$, allows for domain knowledge to be incorporated and for non-linear decision boundaries to be formed. A linear regressor may be expressed as:

$$\hat{f}(x) = \sum_i w_i x_i$$

The weights $w_i$ may be inferred using standard Bayesian inference. The latent function $f$ may be mapped through a sigmoid function to form a logistic regressor to result in posterior class probabilities:

$$\hat{p}(\text{class} = c \mid x) = \sigma\left(\sum_i w_i^c x_i\right)$$

Fitting training data class labels to the linear regressor tends to yield accurate weights for use within the logistic regressor. Learning the weights using the LBM as opposed to the logistic model this way tends to speed up the learning process. This increase in speed tends to be due to the model being linear in free parameters. Thus, rapid fixed-point solutions may be obtained. In contrast other logistic models tend to require non-linear optimisation which tends to result in considerable extra computational cost. Furthermore, any degeneration in predictor performance tends to be insignificant.

An input variable may be deemed to be "irrelevant" if it provides no value in regression onto the target variable. When using generic linear models, the relevance of a (kernel) variable may be determined from the magnitudes of the inferred weights. If the weight is close to zero, then the variable (or kernel) may be deemed to be irrelevant. However, inferring the weights using standard regression algorithms may result in non-zero weights being assigned to irrelevant variables. To account for this, explicit shrinkage priors may be placed over the weights, for example as will now be described.

A linear model may be expressed as;

$$f(x) = w^T x + \epsilon$$

In this example, both $x$ and $f(x)$ have zero mean. In other example, either or bath of $x$ and $f(x)$ may have a different mean. If a particular input, e.g. $x_1$ is uncorrelated with $f(x)$, then $E[f(x)x_1] = 0$. Also, $$\sum_i w_i E[x_i x_1] = 0$$

If $x_1$ is uncorrelated with all other inputs then $E[x_i x_1] = 0$ for all $i \neq 1$. Thus, $w_1 = 0$. All linear regression algorithms will infer $w_1 = 0$ with high certainty in this case and conclude that Shrinkage prior $w_1$ is irrelevant. However, if the input variables are themselves correlated then $w_1$ may be far from zero. Groups of variables which are themselves correlated but irrelevant may be deemed to be relevant. To remove truly irrelevant variables shrinkage priors are placed over the weights.

The posterior evidence of the data given the model may be written in terms of the data likelihood and the model prior. Thus, minimising the negative log likelihood is equivalent to minimising an equivalent error functional of the form $$U = U_{data} - \log p(w)$$

Where: $U_{data}$ is the data error (i.e. the difference between the regression value and the target value); and
$-\log p(w)$ is the negative log of the prior distribution over the weights. Maximum entropy arguments point to a factored zero mean multivariate Normal as this distribution:

$$-\log p(w) = -\frac{1}{2} w^T \alpha w + const$$

in which $\alpha$ is a diagonal matrix of hyper-parameters with elements $a_i$.

The negative gradient of the error equation (i.e. the direction of gradient descent), with respect to the parameters yields $$-\frac{dU}{dw} = -\frac{dU_{data}}{dw} - \alpha w$$

For some weight, e.g. $w_1$, which has little impact on the error of a solution, the term $$\frac{dU}{dw}$$

tends to be relatively small. Thus, changes in the weight tend to be dominated by:

$$\delta w_1 \propto \alpha_1 w_1$$

This may represents a decay of $w_1$ to zero with a rate give by $\alpha_1$. The Bayesian formulation advantageously tends to allow for the simultaneous inference of the distributions over the weights along with the shrinkage parameters $\alpha_1$.

Advantageously, it tends to be possible to use the kernels that may be used for the above described Gaussian Process approach within the LBM approach.

An example of a variational approach to kernel modelling of data which can determine relevant features within a feature vector as well as determine the weights $\lambda$ of the bases will now be described. In this example, variational Bayes steps for the kernel-based LBM for products of kernels are implemented. In other examples, summed kernels may be used instead of products of kernels. In this example, the application of shrinkage priors over the bases is not implemented. However, in other examples the application of shrinkage priors over the bases is implemented. Placing shrinkage priors on the basis weights would identify the most important bases in a manner similar to the Support Vector Machine.

In this example, a model has a non-linear relation between D-dimensional inputs x and outputs y and constant-variance Gaussian noise, such that the data likelihood may be given by:

$$p(y \mid K(x), w, \lambda, \tau) = \left(\frac{\tau}{2\pi}\right)^{\frac{1}{2}} \exp\left(-\frac{\tau}{2}(y - K(x)^T \lambda)^2\right)$$

where the compound vector kernel K is composed of a product of $\kappa$ kernels, $\{k_1, \ldots, k_K\}$, one for each feature, $\kappa$.

$$K(x) = \prod_\kappa k_\kappa(x)^{w_\kappa}$$

All available data may be expressed as $D = \{X, Y\}$ where $X = \{x_1, \ldots, x_N\}$ and $Y = \{y_1, \ldots, y_N\}$. The data likelihood may be expressed as:

$$p(y \mid K(x), w, \lambda, \tau) = \prod_n p(y_n \mid K(x_n), w, \lambda, \tau)$$

The prior on w and τ may be conjugate normal inverse-gamma, i.e.

$$p(w, \tau \mid \alpha) = N(w \mid o, (\tau A)^{-1} I) Gam(\tau \mid a_0, b_0)$$

$$= \left(\frac{|A|^{1/2}}{\sqrt{2\pi}^D}\right)^{D/2} \frac{b_0^{a_0}}{\Gamma(a_0)} \tau^{\frac{D}{2}+a_0-1} \exp\left(-\frac{\tau}{2}(w^T A w + 2b_0)\right)$$

where the vector $\alpha = (\alpha_1, \ldots, \alpha_D)^T$ forms the diagonal of A. The values $\alpha_i$ are independent, such that the hyper-prior is given by $$p(\alpha) = \prod_i Gam(\alpha_i \mid c_0, d_0)$$

$$= \prod_i \frac{1}{\Gamma(c_0)} d_0^{c_0} \alpha_i^{c_0-1} \exp(-d_0 \alpha_i)$$

The hyper-prior of the weights A, of the bases may be given by:

$$p(\lambda) = N(\lambda \mid \lambda_0, P_0)$$

Variational posteriors may be calculated using and appropriate method. For example, the method described in W. Penny and S. Roberts "*Bayesian methods for autoregressive models*", Proceedings of Neural Networks for Signal Processing, Sydney, Australia, December 2000 (which is incorporated herein by reference) may be used. Also for example, the method described in S. Roberts and W. Penny, "*Variational Bayes for Generalised Autoregressive Models*", IEEE Transactions on Signal Processing, 50(9):2245-2257, 2002 (which is incorporated herein by reference) may be used. Also for example, the method described in W. Penny and S. Roberts, "*Bayesian Multivariate Autoregressive Models with Structured Priors*", IEE Proceedings on Vision, Signal & Image Processing, 149(1):33-41, 2002 (which is incorporated herein by reference) may be used. Also for example, the method described in J. Drugowitsch, "*Bayesian Linear Regression*". Technical report, Laboratoire de Neurosciences, Cognitives: http://www.inc.ens.fr/~jdrugowi, 2010 (which is incorporated herein by reference) may be used.

In some examples, an exponential distribution over $k_i^{w_i}$ may be identified. In other examples, a compound kernel may be approximated via a Taylor expansion about the mean of w. Thus, the variational posterior expression for α may be identical to that for linear regression. To aid convergence of the Taylor Expansion algorithm, the mean of w may be smoothed by combining the value of the mean of w calculated during a current iteration with the value of the mean of w carried over from the previous iteration. If convergence is not achieved after a predetermined number of iterations (e.g. 500) the algorithm may be stopped. A warning indicating non-convergence may be displayed.

The predictive density may be evaluated by approximating the posterior distributions p(w,τ|D) and p(λ) by their variational counterparts q(w,τ) and q(λ) respectively. The target class probability may be given by:

$$E[\sigma(f(x))] = \int_w \int_\tau \int_\lambda \sigma(K(x,w)^T \lambda) q(w,\tau) q(\lambda) dw d\tau d\lambda$$

A solution to this integral may be approximated as:

$$E[\sigma(f(x))] \approx \sigma(K(x, E_w[w]) T E_\lambda[\lambda])$$

Thus, as an alternative to a Gaussian Process approach, a number of algorithms based on the linear basis model (LBM) are provided. The LBM advantageously supports kernel-based methods for non-linear classification. Furthermore, the same kernels to those used in the Gaussian Process approach may be used.

Either a non-linear or linear learning algorithm may be implemented. Both non-linear and linear algorithms may use the same pre-processing steps and multiple class extension.

Examples of pre-processing techniques include normalisation, balancing and individual relevance determination.

Normalisation pre-processing may comprise normalising the scale variation in each element of a vector of observed features x. This tends to allow for the magnitude of each of the elements in a set of regression coefficients w (or weights) to be indicative of the relevance of an element of x.

Balancing pre-processing may comprise re-sampling with replacement of under-represented classes, or sub-sampling from over-represented classes, during the training procedure. This tends to compensate for biasing in posterior beliefs.

Individual relevance determination pre-processing may comprise evaluating the performance of sets of univariate linear regressors of the form $$\tilde{f}(x_i) = w_i x_i$$

The performance on the training data may be evaluated and features $x_i$ which show performance better than random may be retained. These retained features may be used to form a subset x* of the original vector set x. Full Bayesian regression may then be performed using this subset. This, in effect, allows the weights of those features in x not in x* to be equal to zero.

The pre-processing steps advantageously tend to improve an algorithm's efficiency and performance.

In the Gaussian Process approach, a kernel may be interpreted as a prior covariance over state variables. Thus, background information may be encoded within the Gaussian Process approach.

The invention claimed is:

1. A method of processing data, the method comprising:
   pre-processing, by a first computer processor, first data received at a first system input to generate first pre-processed data, wherein the first computer processor is coupled to a data fusion computer processor, and wherein the first computer processor is coupled to the first system input and configured to pre-process a first type of data received from a first data source at the first system input;
   pre-processing, by a second computer processor, second data received at a second system input to generate second pre-processed data, wherein the second computer processor is coupled to the data fusion computer processor, and wherein the second computer processor is coupled to the second system input and configured to pre-process a second type of data received from a second data source coupled to the second system input;
   wherein the first data received at the first system input is from the first data source and includes a first plurality of data points and the second data received at the second system input is from the second data source and includes a second plurality of data points, the second data source being different from the first data source;

performing, by the data fusion computer processor, a kernel function on the first pre-processed data and the second pre-processed data to provide kernelised data; and applying a regression technique to the kernelised data to identify a data source providing data associated with a higher significance of relevant features between the first data source and the second data source; and using the identified data source to determine a position of a vehicle proximate the first data source and the second data source.

2. The method of claim 1, wherein a first data point of the first plurality of data points is a data feature extracted from raw data using a first feature extraction process, and at least one of a second data point of the second plurality of data points results from a second feature extraction process different from that for the first data point.

3. The method of claim 2, wherein the kernel function is a sum of further functions, each further function being a function of at least one of: a data point of the first data received at the first system input and a data point of the second data received at the second system input.

4. The method of claim 3, wherein the kernel function is a Squared Exponential kernel, a Nominal kernel or a Rank kernel.

5. The method of claim 1, wherein a first data point of the first plurality of data points is a data feature extracted from raw data using a feature extraction process, and a data source is a source of raw data.

6. The method of claim 1, wherein the kernel function is a sum of further functions, each further function being a function of at least one of: a data point of the first data received at the first system input and a data point of the second data received at the second system input.

7. The method of claim 6, wherein for a first data point of the first plurality of data points, and for a second data point of the second plurality of data points, the further function performed on the first data point is a different function from the further function performed on the second data point.

8. The method of claim 1, wherein the kernel function is a product of further functions, each further function being a function of at least one of: a data point of the first data received at the first system input and a data point of the second data received at the second system input.

9. The method of claim 8, wherein for a first data point of the first plurality of data points, and a second data point of the second plurality of data points, the further function performed on the first data point is a different function from the further function performed on the second data point.

10. The method of claim 1, wherein the kernel function is a Squared Exponential kernel, a Nominal kernel or a Rank kernel.

11. The method of claim 1, wherein the regression technique comprises:
implementing a Gaussian Process.

12. The method of claim 1, comprising:
measuring the further system input.

13. A program or plurality of programs stored on a non-transitory computer readable medium such that when executed by a computer system or one or more processors it/they cause the computer system or the one or more processors to operate in accordance with the method of claim 1.

14. A computer system in combination with a machine readable storage medium storing a program or at least one of the plurality of programs according to claim 13.

15. Apparatus for processing data, the data including:
a first computer processor coupled to a first system input and to a data fusion processor, the first computer processor configured to receive first data at the first system input and to pre-process the first data including a first type of data to generate first pre-processed data;

a second computer processor coupled to a second system input and to the data fusion processor, the second computer processor configured to receive second data at the second system input and to pre-process the second data including a second type of data to generate second pre-processed data;

wherein the first data received at the first system input is from a first data source and the second data received at the second system input is from a second data source, the second data source being different from the first data source, and the first data and the second data each include a plurality of data points;

wherein the data fusion processor is configured to:
perform a kernel function on the first pre-processed data and the second pre-processed data to provide kernelised data; and apply a regression technique to the kernelised data to identify a data source providing data associated with a higher significance of relevant features between the first data source and the second data source; and use the identified data source to determine a position of a vehicle proximate the first data source and the second data source.

16. The apparatus of claim 15, wherein the first data source and the second data source are heterogeneous data sources.

17. The apparatus of claim 16, wherein;
the first and second data comprises raw data; and
the first and second computer processors are configured to perform a respective feature extraction process on their respective raw data so as to output feature vectors of a respective feature vector type derived from raw data obtained from a respective data source, the apparatus being configured to generate a set of input vectors, each input vector comprising at least one feature vector derived from raw data obtained from a respective each of said plurality of heterogeneous data sources, and to apply each input vector to said data fusion processor to generate a corresponding output function, said output function including weighted elements having respective weight values;

and the data fusion processor being configured to produce a respective kernel function for each of the feature vectors and, in respect of each input vector, apply said respective kernel function to the or each corresponding feature vector thereof to generate kernelised data, and to apply a regression technique to said kernelised data to generate said weight values, wherein each weight value is indicative of a significance of data from a respective data source.

18. The apparatus of claim 15, wherein the first data source is external to a vehicle, and configured to determine a position of the vehicle when the vehicle is in motion with respect to the stationary first data source.

19. The apparatus of claim 15, further comprising a third computer processor, wherein the third computer processor is coupled to the first system input and to the data fusion computer processor, wherein the third computer processor is configured to receive the first data at the first system input and to pre-process the first type of data received at the first system input to generate third pre-processed data.

20. The apparatus of claim 19, wherein the first computer processor applies a first function to the first data and the third computer processor applies a second function, different from the first function, to the first data to, respectively, generate the first pre-processed data and the third pre-processed data.

* * * * *